United States Patent [19]

Reese et al.

[11] Patent Number: 4,661,139
[45] Date of Patent: Apr. 28, 1987

[54] VACUUM PRESSING OF GLASS DOUBLETS

[75] Inventors: Thomas J. Reese, Sarver; John J. Ewing, Tarentum; Michael T. Fecik, Pittsburgh; Robert G. Frank, Murrysville; Terry A. Bennett, Monroeville, all of Pa.

[73] Assignee: PPG Industries, Inc., Pittsburgh, Pa.

[21] Appl. No.: 807,088

[22] Filed: Dec. 10, 1985

[51] Int. Cl.$^4$ .............................................. B65H 3/08
[52] U.S. Cl. ...................................... 65/106; 65/111; 65/273; 294/64.1; 294/65
[58] Field of Search ................ 65/106, 273, 287, 111; 294/64.1, 65

[56] References Cited

U.S. PATENT DOCUMENTS

| | | | |
|---|---|---|---|
| 2,049,850 | 8/1936 | Lytle et al. | 294/65 |
| 3,272,611 | 9/1966 | Jorgensen | 294/65 |
| 3,467,430 | 9/1969 | Lowe | 294/65 |
| 3,846,104 | 11/1974 | Seymour | 65/104 |
| 4,197,108 | 4/1980 | Frank et al. | 65/273 |
| 4,229,200 | 10/1980 | Seymour | 65/106 |
| 4,260,408 | 4/1981 | Reese et al. | 65/106 |
| 4,260,409 | 4/1981 | Reese et al. | 65/273 |
| 4,265,650 | 5/1981 | Reese et al. | 65/104 |
| 4,272,274 | 6/1981 | Frank et al. | 65/273 |
| 4,375,978 | 3/1983 | Reese et al. | 65/287 |
| 4,508,556 | 4/1985 | Bennett et al. | 65/25.4 |

Primary Examiner—Arthur Kellogg
Attorney, Agent, or Firm—Andrew C. Siminerio

[57] ABSTRACT

A pair of heat softened overlaying glass sheets are held by vacuum against an apertured engaging surface of a vacuum holder. The overlaying glass sheets can be shaped before, during, or after being held by the vacuum holder.

23 Claims, 6 Drawing Figures

VACUUM PRESSING OF GLASS DOUBLETS

BACKGROUND OF THE INVENTION

1. Field of the Invention

This invention relates to the shaping of glass sheets and, more particular, to the simultaneous shaping of two or more glass sheets biased against each other and an upper mold by vacuum.

2a. Technical Considerations

The techniques of sag bending to form shaped glass windows for automobiles and the like as discussed in U.S. Pat. No. 4,375,978 to Reese is well known. The glass sagging technique has been the method used to bend two glass sheets simultaneously, which sheets have subsequently laminated together to form a laminated automobile windshield. Glass sheets are positioned on a skeletal bending mold with a shaping rail that conforms to the shape and final configuration of the glass sheet to be shaped slightly inboard of the edge of the glass. The bending molds are then conveyed in succession through a heating lehr where the glass sheets are heated to their deformation temperature and begin to sag by gravity until the glass sheets conform to the configuration of the shaping rail. After the glass sheets have been properly deformed, the molds are conveyed through an annealing zone where the glass sheets are cooled in a controlled manner from their deformation temperature through their annealing range to anneal the glass sheets.

In order to fabricate more complex and deeper bend in the glass doublets used in windshields, the bending molds have been designed to include mold rails with articulated rail sections having end rail sections whose contours conform to the outline and shape desired for the longitudinal end portions of the glass sheets to be bent. The end rail sections are constructed and counterweighted to pivot downward into a lower position to support the mass of the relatively stiff flat glass sheets to be bent. When the glass sheets are softened by heat, the end sections pivot upward into an upper position where they cooperate with additional shaping rails to form a substantially continuous outline shaping surface conforming in contour and elevation to the shape desired for the glass sheets.

As automobile stylists demand even more complex shapes such as deep wraps and reverse curvature bends, press bending techniques have been used. Bending to such complicated shapes requires that the glass sheets be supported in precise alignment between upper and lower molds that are used to impart the different components of the complicated bends to which the glass sheets are to be shaped. In these doublet press bending techniques, the heat softened doublet is lifted off a ring bending mold pressed between upper and lower molds and redeposited onto the ring bending mold by the lower bending mold for subsequent processing, such as annealing.

2b. Patents of Interest

U.S. Pat. No. 3,846,104 to Seymour discloses a method and apparatus for shaping and cooling single glass sheets. Individual glass sheets are heated to their deformation temperature in a gas hearth furnace and conveyed into a glass shaping station, then a cooling station, and finally in a loading station. In the shaping station, the glass sheet is stopped in alignment with a lower ring mold that moves vertically between a recessed position and a raised position. The lower ring mold lifts the glass into engagement against an upper vacuum mold. The upper mold is evacuated to hold the shaped glass sheet thereagainst, while the lower mold is retracted downward. A tempering ring having an outline supporting surface conforming to the contour of the shaped glass sheet slightly inboard of the sheet periphery is brought into position between the upper and lower molds. The vacuum on the upper mold is released to deposit the shaped glass sheet on the tempering ring. The latter supports the bent glass sheet during movement to and residence at a cooling station. The tempering ring is then unloaded and returned to a position adjacent the shaping station to repeat the cycle.

U.S. Pat. Nos. 4,197,108 and 4,272,274 to Frank et al. disclose the use of a slotted glass sheet shaping mold capable of shaping glass sheets having different outlines, but bent to the same radius of curvature. The lower mold is comprised of a plurality of smoothly curved, upwardly facing, elongated shaping members extending continuously across the entire transverse dimension of the mold. The shaping members are separated by transversely extending grooves that extend completely across the entire transverse dimension of the shaping mold, having sufficient width and depth to permit clearance for raising the mold above a horizontal path of glass travel defined by glass conveying rolls. In operation, individual sheets of glass are serially conveyed through a furnace, heated to their deformation temperature and positioned over and lifted off the glass conveying rolls by the slotted mold into engagement with an upper vacuum mold. The slotted mold retracts into its lower position and the upper mold deposits the shaped glass on a tempering ring, moved into position beneath the upper mold, for movement of the sheet into the quench station and subsequent handling.

U.S. Pat. No. 4,229,200 to Seymour discloses drop forming hot glass sheets with auxiliary shaping means. Individual glass sheets are serially conveyed through a gas hearth furnace and heated to their deformation temperature. The heat softened glass sheets are then positioned below and lifted by a flat vacuum platen. Portions of the glass sheet are preshaped by auxiliary shaping means while the sheet is held against the platen. The glass sheet is then dropped onto a shaping ring to impart the complete desired curvature to the glass sheet. The shaped glass sheet is thereafter transferred to a cooling station.

U.S. Pat. Nos. 4,260,408, 4,260,409 and 4,265,650 to Reese et al. disclose a method of bending pairs of glass sheets. The pairs of glass sheets are positioned on ring-type outline bending molds and conveyed through a bending lehr where the glass sheets are heated to their deformation temperature. The glass sheet pair is sag bent in unison on the outline mold to bend the sheets to a shape approximating their final configuration. The pair of bent glass sheets is then lifted on a full face lower mold having the final desired shape for the minimum time sufficient to develop the final configuration. If necessary, the lower mold engages an upper pressing mold to sandwich the pair of glass sheets therebetween. The pair of bent glass sheets is returned as rapidly as possible to the outline mold and cooled at a controlled rate while supported on the outline mold to a temperature below the strain point to ensure that the pair of glass sheets retain their shapes so that they can be laminated subsequently with minimum difficulty.

U.S. Pat. No. 4,508,556 to Bennett et al. discloses a method and apparatus for bending glass sheets to complicated shapes. Individual sheets of heat softened glass are conveyed through a heating furnace and positioned in the shaping station on a gas hearth bed. A curved outline mold vertically lifts the glass sheet off the gas hearth bed and into contact with a shaped upper vacuum mold for forming. The outline mold retracts with the shaped glass sheet being held against the upper vacuum mold and a tempering ring shuttles into position beneath the upper mold. Vacuum is discontinued and the glass drops onto the ring which is transferred to the cooling station.

In all of these patents, either (a) a single glass sheet is shaped by an upper vacuum mold that holds the shaped glass sheet in contact thereagainst for subsequent deposition of the sheet on a tempering ring positioned thereunder or (b) a pair of glass sheets is preliminary sag bent on a bending iron and lifted off the iron by a lower mold and pressed between the lower and upper mold. The shaped pair of glass sheets is then redeposited on the bending iron for subsequent processing. It would be beneficial to provide a process wherein multiple plies of overlaying glass sheets could be formed between upper and lower molds, and the plies held in place by the upper vacuum mold as the lower mold is retracted.

SUMMARY OF THE INVENTION

The object of the invention is to provide a method of shaping glass sheets wherein the sheets are heated to their heat softening temperature and thereafter at least two overlaying heat softened glass sheets are held by vacuum against an apertured engaging surface of a vacuum holder. The overlaying glass sheets are held together and against the vacuum holder while a transfer ring moves beneath the holder. The vacuum is discontinued and the overlaying glass sheets are deposited on the transfer ring for movement to a subsequent processing area, such as annealing. The overlaying glass sheets can be shaped before being held against the vacuum holder by pressing the sheets between a lifting ring or mold and the vacuum holder. The sheets can also be shaped while being held against the holder by using a deformable holder. Furthermore the sheets can be formed after being held against the vacuum holder by depositing the sheets on a contoured shaping ring.

DESCRIPTION OF THE PREFERRED EMBODIMENT

The description of the present invention that follows depicts its use in conjunction with a horizontal press bending method and apparatus as taught in U.S. Pat. Nos. 4,197,108 and 4,272,274, which teaching are hereby incorporated by reference, and is not meant to limit the invention. Its use with the aforementioned apparatus is illustrative and it is contemplated that the present invention can be used with any type of horizontal press bending operation that is capable of shaping a stacked pair of glass sheets, as will be discussed later.

Figure 1:
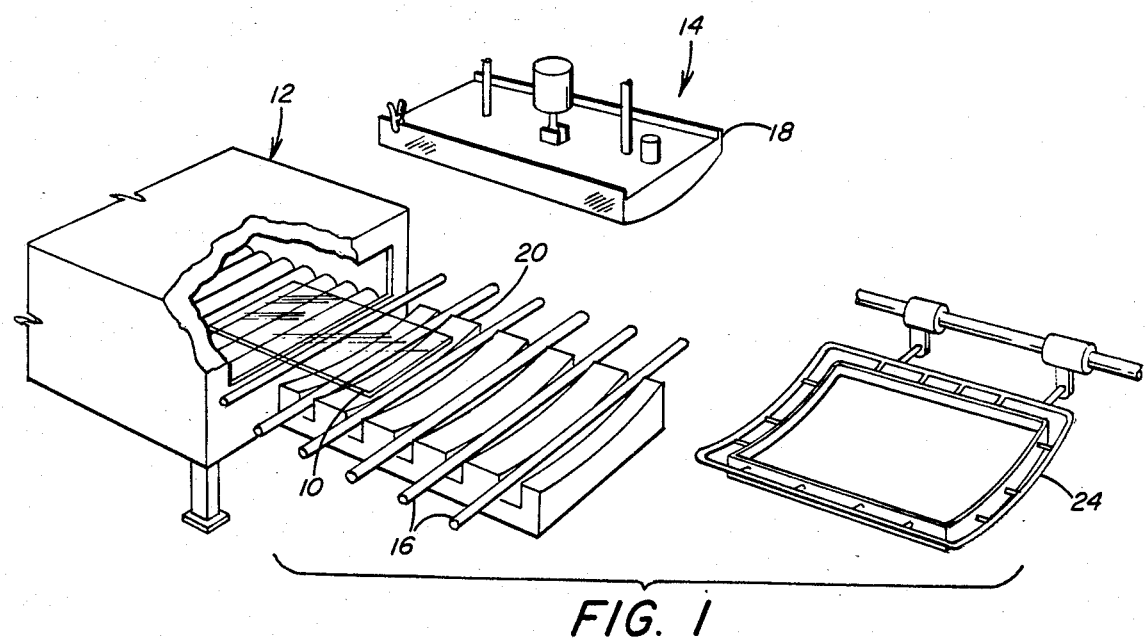
FIG. 1 is an isometric view of a horizontal press bending arrangement showing a pair of glass sheets being conveyed from a heating furnace to a shaping station.

In the present invention, stacked pairs of glass sheets 10, or doublets, are conveyed through a furnace 12 and heated to their deformation temperature, as shown in FIG. 1. The heat softened doublets 10 exit the furnace 12 and are positioned in the shaping station 14 by a high speed roll runout 16 between and an upper vacuum mold 18 and a lower segmented lifting mold 20. The lower mold 20 lifts the doublets 10 off the runout rolls 16 and into contact with the upper vacuum mold 18 such that the doublet 10 is shaped therebetween. The lifting mold 20 retracts and both sheets of the doublet 10 remain held against an apertured engaging surface 22 by the vacuum applied by the upper vacuum mold 18 for a sufficient time period for an annealing ring 24 to position itself between the molds 18 and 20 and under the shaped doublet 10. The vacuum in the upper mold 18 is thereafter discontinued, depositing the doublet 10 on the annealing ring 24 which transfers the shaped doublet 10 to an annealing zone (not shown) for further processing.

Figure 2:
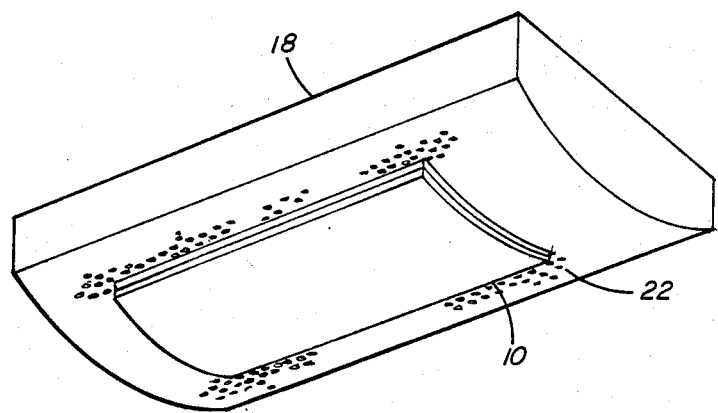
FIG. 2 is an isometric view of the pressing surface of an upper vacuum mold showing a pair of shaped glass sheets being held thereagainst, in accordance to the teachings of the invention.

Initial testing of shaping doublets for windshields on a horizontal press bending apparatus and holding the shaped doublets on the upper vacuum mold after the lower mold retracts were initiated on a shaping apparatus similar to that taught in U.S. Pat. No. 4,197,108 and shown in FIGS. 1 and 2. The first trial run used a deformable type vacuum top press made to a 90" (229 cm) radius curve. The press face was ⅛" (0.32 cm) thick and 3/16" (0.48 cm) diameter vacuum holes on 2" (5.08 cm) staggered centers. Heating time for the glass sheets was 3 minutes and the glass sheet temperature exiting the furnace (top glass ply) ranged from 1250° F. to 1291° F. (677° C. to 699° C.). The bottom ply temperature ranged between 20° F. and 41° F. (11° C. to 23° C.) colder than the top ply. At the beginning of the trial run, the vacuum in the top press cavity ranged between 1½" to 3" (3.81 cm to 7.62 cm) water (manometer). In most of the bends made, the two plies separated from each other as the bottom press retracted although in a few cases top vacuum mold did hold both sheets of the doublet momentarily, but not for a sufficient time to move the ring 24 under the doublet 10 with the apparatus as used. In all cases, separation of the overlaying glass sheets occurred with the bottom ply peeling away from the top ply, starting at the trail edge of the pattern or at a point slight forward of the trail edge in the long dimension. Further testing revealed that reducing the vacuum level in the top press increased the length of time that the bottom ply "adhered" to the top ply. Best results were realized with a vacuum level of approximately ½" (1.27 cm) water (vacuum reading taken with the glass not in contact with the press face). At this vacuum level the bottom ply held to the top ply for approximately 2 to 4 seconds before peeling off at the trail edge.

At that time, it was believed that the improvement in the holding time was achieved because the lower vacuum level did not deform the face plate of the vacuum press. The vacuum press had a thickness of ⅛ inch (0.32 cm) and is believed that the higher vacuum levels with the light construction of the press caused the press face to wrinkle or buckle in localized areas pulling the top ply away from the bottom ply and initiating the peeling action.

To overcome this wrinkling or buckling of the press face, a new more rigid top press was constructed using a 3/16" (0.48 cm) thick face plate solidly fastened to an open bottom box type vacuum chamber. The face plate was rolled to the same 90" (229 cm) radius curvature as the earlier press face and had the same 3/16" (0.48 cm) diameter vacuum holes on staggered 2" (5.08 cm) centers. It was later found that the earlier deformable press had a permanent kink in the press face near the trail edge where separation was observed to initiate in a number of the earlier trial runs. It is possible that this kink, rather than wrinkling of the press face, may have been the primary cause of bottom ply separation in the first trials. At the lower vacuum levels the top glass ply may not have pulled into the kink area.

A second trial was made using the newly constructed solid face plate using 0.09" (0.23 cm) and 0.10" (0.25 cm) thick glass. All pressing attempts using the 0.09" glass were successful, with the two sheets holding together until the quench ring was in place below the upper vacuum mold. During this portion of the trial, most of the glass doublets broke when dropped on the quench ring after the vacuum was released. It is believed that the breaking was partly attributable to the fact that the contours of the quench ring did not sufficiently compliment the doublet as shaped by the upper and lower molds so that the ring was forming a compound rather than cylindrical bend as formed by the molds.

All initial pressing attempts using the 0.10" (0.25 cm) thick glass sheets were unsuccessful. The bottom glass ply dropped or peeled away from the top ply in spite of any changes made to the pressing procedure. The separation of the two plies appeared to originate, as in the earlier trials, at the trail edge of the pattern. The glass continued to fall away from the top press before the vacuum was released, even when the pressing of doublets was stopped, and the glass used was changed to single 3/16" (0.48 cm) thick plies. After removal of the fiberglass cloth press face cover, a check of the flatness of the press face with a straight edge showed the face plate had warped from repeated contact with hot glass. Deviation from the straight edge was approximately ½" (1.27 cm) at the trail edge of the press at the center line.

The top press was removed from the furnace and the face plate was straightened. Stiffening ribs with an egg crate arrangement were welded between the face plate and the top plate of the press box. Deviation of the press plate from the straight edge placed lengthwise on the press face was approximately 1/32" (0.08 cm) after the modification was completed.

The top press face was reinstalled and bending trials were resumed. The initial pressing attempts with the reinforced press face using 0.09" and 0.10" thick glass were again unsuccessful in that the bottom ply failed to hold to the top ply, with peeling starting at the trail edge. Two exceptions to this were runs made with the doublets assembled without the diatomaceous earth (talc) parting medium between the sheets. In this case, the glass sheets held together because the two plies fused.

The glass exit temperature (top ply) was then reduced from a previous normal range of between 1260° F. to 1280° F. (682° C. to 693° C.) and range between 1167° F. to 1190° F. (631° C. to 643° C.). This major process change resulted in the glass sheets holding against the top press face for a reasonable length of time. This period (approximately 4 to 5 seconds) was measured as the time between when the bottom press starts to retract until when the carriage with the tempering ring moves into place to accept the shaped doublet from the top press. It is believed that the lower glass temperature gave more rigidity to the glass and reduced the tendency for the lower glass sheet to peel away.

During testing, the existing tempering ring, which was curved on all four sides, was modified so that the two longitudinal sides were flat, making a true cylindrical bend instead of a compound bend. This was done primarily to prevent bending of the glass after the initial press operation. With the lower glass temperature, the dropping of the glass onto the compound shaped ring caused the glass to break instead of bend. The bends that did not break when dropped onto the ring usually broke during cool down to room temperature since there were no provisions made for annealing the glass during the test.

Additional testing was inconsistent in holding the shaped doublets to the top press until the tempering ring was in position. It is believed that fluctuations in furnace conditions and glass sheet slippage contributed to this inconsistency.

Figure 3:
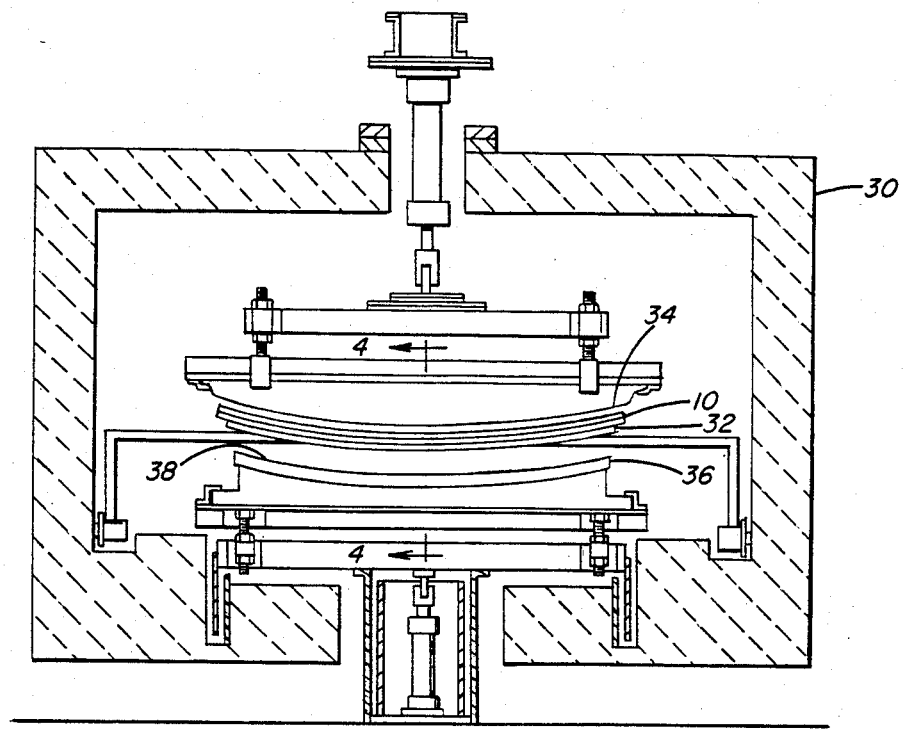
FIG. 3 is a cross sectional view of an alternate shaping station for press bending the glass doublets showing a pair of glass sheets on a bending iron at the shaping station of a bending lehr, with portions removed for clarity.
Figure 4:
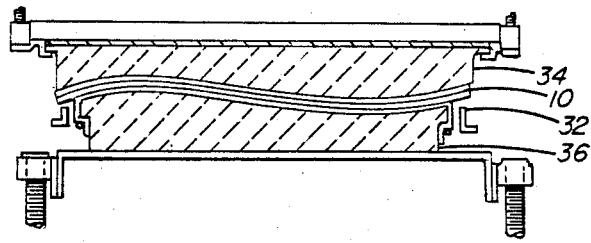
FIG. 4 is a cross sectional view taken through line 4—4 on FIG. 3 showing the pair of glass sheets being pressed.

Additional testing was performed in press bending arrangements similar to that disclosed in U.S. Pat. No. 4,265,650 which teaches pressing within a heating lehr and U.S. Pat. No. 4,508,556 which teaches shaping glass sheets to complex configurations by lifting the heat softened glass off of a gas hearth bed with a ring mold, both of which patents are hereby incorporated by reference. In the in-lehr pressing arrangement the 0.09 in (0.23 cm) thick glass sheet doublet 10 is conveyed through heating lehr 30 on bending iron 32, as shown in FIG. 3. The doublet sags to a preliminary shape while being conveyed through the lehr 30. In non-vacuum press arrangements, the iron 32 is positioned below upper mold 34 and a lower lifting mold 36 with an upwardly facing lifting surface 38 positioned below the bending iron 32 moves vertically upward through the bending iron 32 to lift the doublet 10 off of the iron 32 and press it against an upper mold 34 so as to then shape the doublet to its final desired shape. However, during testing, the lower mold 36 lifted the doublet 10 off the iron 32 and moved the upper surface of the doublet 10 to within 1/16 inch (0.16 cm) of the pressing surface of the upper vacuum mold 34 as shown in FIG. 4. The upper vacuum mold 34 lifted both glass sheets 10 and held them thereagainst for shaping. Vacuum was then discontinued and the doublet was dropped back onto the lower mold 36. The mold 36 thereafter retracted, redepositing the shaped doublet 10 on the bending iron 32 which continued into an annealing zone (not shown). In a production operation, rather than being deposited back onto the bending iron 32, the doublet 10 would most likely be deposited on an annealing ring (not shown) positioned between the upper vacuum mold 34 and retracted lower mold 36 to transfer the doublet 10 downstream to an annealing zone (not shown).

During the press-in-lehr trials, both glass sheets were lifted and held by the vacuum to the top press when a press gap of 1/16" (0.16 cm) was set between the top surface of the top glass sheet and the top vacuum press. It was not established how long the bottom glass ply would remain in contact with the top glass sheet before dropping away, but the sheets did stay together when a three second press hold time was used. Optical distortion was very severe in one windshield in which the press hold time was extended. Glass surface dimpling was seen in patterns very closely approximating the vacuum hole pattern drilled in the top press face. All vacuum pressed windshields were laminated successfully.

Figure 5:
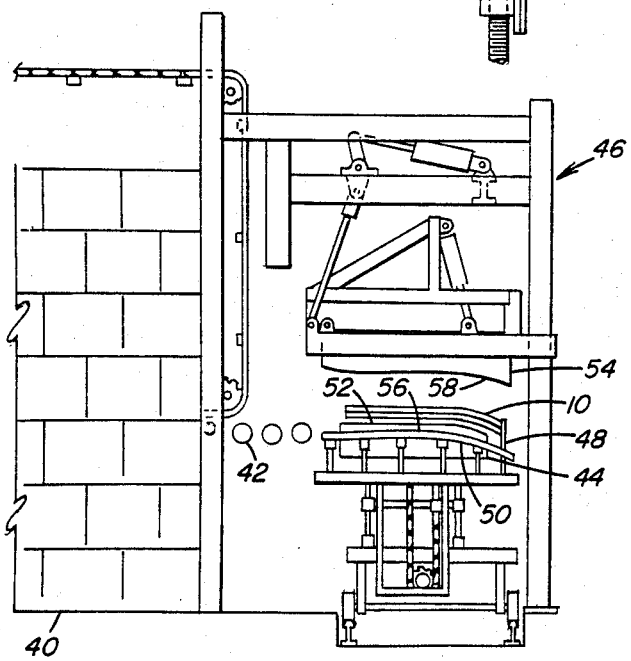
FIG. 5 is an elevational view of another alternative shaping station for press bending the glass doublets, showing a pair of glass sheets exiting a furnace and onto a gas hearth block.
Figure 6:
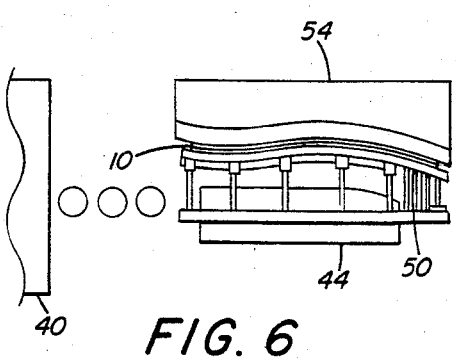
FIG. 6 is an elevational view of the shaping station shown in FIG. 5 showing the doublet being pressed.

In the gas hearth block pressing as shown in FIGS. 5 and 6, the doublet 10 is conveyed through a furnace 40, preferably a gas hearth or roller hearth type and heated to its softening temperature. The doublet 10 exits the furnace 40 over a high speed conveyor roll complement 42 and is conveyed onto a gas hearth block 44 at a shaping station 46. Stop means 48 position the doublet on the block 44. When the doublet 10 is in position, a ring mold 50 which extends around the periphery of the gas hearth block 44 and beyond the periphery of the doublet 10 engages the doublet 10 and lifts it off gas hearth support surface 52 and into engagement with an upper vacuum mold 54. The ring mold 50 preferably engages the entire outer perimeter of the doublet 10 with a pressing surface 56 that compliments a corresponding surface of upper vacuum mold shaping surface 58. The vacuum in the upper mold 54 is drawn to pull the doublet 10 against the vacuum mold shaping surface 58. When the ring mold 50 is retracted, the vacuum mold 54 retains vacuum and holds the doublet 10 thereagainst for a time sufficient for an annealing ring (not shown) to move under the shaped doublet 10 and support the doublet 10 when the vacuum is discontinued. The annealing ring (not shown) thereafter transfers the doublet 10 into a cooling station (not shown) for subsequent processing.

During limited trials with the gas hearth block type pressing arrangement using 0.90" (0.23 cm) thick glass, the doublets looked and reacted just like monolithic 0.90" (0.23 cm) glass during transfer from the furnace to the forming station. It was observed that successful forming of the doublets into complex configurations and transfer of the doublets to a transfer ring were the result of the following conditions: (a) glass exit temperature of 1195° F. (646° C.) measured at the top glass sheet, (b) minimum vacuum—just enough to hold the weight of the doublets (2" (5.08 cm) water without the glass doublet), and (c) a good peripheral seal on the doublets both to each other and to the vacuum press resulting from the use of a continuous ring mold that extends beyond the doublet periphery. The optical quality of the unlaminated doublets appeared to be good considering the limited testing and the fact that there were no annealing facilities to minimize post forming warpage and separation.

It is understood that rather than using a contoured vacuum mold 18 to shape the overlaying glass sheets as illustrated in FIGS. 1 through 6, a flat vacuum holder can be used to hold the overlaying glass sheets. The overlaying glass sheets can be shaped while being held against the vacuum holder by using a deformable vacuum holder. As an alternative the glass sheets can be shaped after being held against the vacuum holder by dropping the flat overlaying glass sheets on a contoured shaping ring so as to allow the glass sheets to conform to the shape of the ring.

The phenomenon of the two sheets of glass holding together on the vacuum mold is believed to be the result of a vacuum environment created between the glass sheets, a good match and alignment between the top and bottom sheet, and the stiffness of the bottom sheet. Before the glass sheets as doublets can separate, the atmospheric pressure must drive air between the two sheets. The seal between the sheets coupled with the stiffness of the bottom sheet acts to retard the air movement, resulting in a time delay. This phenomenon affords sufficient time delay so that the doublets can be held together as a set for a long enough time allowing the transfer ring to be positioned beneath the doublet. In addition, the use of a continuous lifting ring mold to lift the doublet and press its peripheral edge between the ring mold and upper vacuum mold may also increase the time delay by making it more difficult for the air to reenter the area between the glass sheets of the doublets, through the pressed periphery. It is believed that the vacuum environment created by the additional holes in the vacuum press that surround the periphery of the sheets may also add to this time delay. The holes evacuate an adjacent area around the periphery of the doublet and may also evacuate some of the minute air between the sheets near the periphery. As a result, there is an additional time delay before a sufficient amount of air can enter between the sheets and cause separation.

The forms of the invention shown and described herein represent illustrative embodiments and it is understood that various changes can be made without departing from the scope of the invention.

We claim:

1. A method of handling at least two overlaying, unattached glass sheets comprising:

drawing a vacuum through a lower apertured engaging surface of a vacuum holder;

moving said overlaying unattached glass sheets into engagement with said engaging surface of said vacuum holder; and maintaining said vacuum to hold said overlaying unattached sheets against said engaging surface of said vacuum holder.

2. The method as in claim 1 including the step of removing said overlaying glass sheets from said vacuum holder.

3. The method as in claim 2 further including the step of heating said overlaying glass sheets to their heat softening temperature prior to said moving step.

4. The method as in claim 3 wherein said heating step includes simultaneously heating at least two overlaying glass sheets.

5. The method as in claim 4 wherein said maintaining step further includes the step of establishing a negative pressure around the periphery of said overlaying glass sheets.

6. The method as in claim 4 including the step of cooling said overlaying said glass sheets.

7. The method as in claim 3 wherein said heating step further includes heating the glass sheet that contacts said apertured engaging surface of said vacuum holder to a higher then said remaining glass sheets prior to said moving step.

8. The method as in claim 7 wherein said glass sheet in contact with said apertured engaging surface is heated to a temperature range between approximately 1160° F. (627° C.) and 1200° F. (649° C.) prior to contacting said engaging surface.

9. The method as in claim 3 wherein said removing step includes:
   positioning a transfer means beneath said vacuum holder;
   depositing said overlaying glass sheets on said transfer means by discontinuing said vacuum; and
   moving said transfer means and said overlaying sheets to a position away from said vacuum holder.

10. The method as in claim 9 further including the step of positioning said overlaying unattached glass sheets beneath and spaced from said engaging surface of said holder.

11. The method as in claim 10 wherein said vacuum holder is an upper vacuum mold and wherein said moving step further includes the step of engaging at a least a portion of a lower major surface of said overlying glass sheets with a lifting mold whose upper shaping surface generally complements said engaging surface of said upper vacuum mold.

12. The method as in claim 11 including the step of shaping said overlaying glass sheets during said maintaining step.

13. The method as in claim 12 wherein said vacuum mold is a deformable vacuum mold and further including the step of deforming said vacuum mold after said engaging step so as to deform said overlaying glass sheets engaged thereagainst.

14. The method as in claim 12 including the step of shaping said overlaying glass sheets before said maintaining step.

15. The method as in claim 15 wherein said vacuum mold is a contoured vacuum mold.

16. The method as in claim 15 wherein said engaging step includes the steps of engaging said lower surface of said overlaying glass sheets with a slotted lifting mold and lifting said overlaying glass sheets into contact with said upper vacuum mold.

17. The method as in claim 15 wherein said engaging step includes the steps of engaging at least a portion of the periphery of said overlaying glass sheets with a ring mold having an engaging surface complementing said engaging surface of said upper contoured vacuum mold and lifting said ring mold and said overlaying glass sheets into contact with said engaging surface of said upper vacuum mold.

18. The method as in claim 17 wherein said ring mold has an engaging surface that extends beyond the periphery of said overlaping glass sheets and said engaging step further includes engaging the entire periphery of said overlaying glass sheets with said ring mold.

19. The method as in claim 15 wherein said heating step further includes the steps of positioning said overlaying glass sheets on a bending iron and conveying said bending irons through a heating lehr.

20. The method as in claim 19 wherein said engaging step includes the step of engaging said lower major surface of said overlaying glass sheets with a lower full surface press face and pressing said overlaying glass sheets between said upper vacuum molds and lower press face.

21. The method as in claim 9 including the step of shaping said overlaying glass sheets after said maintaining step.

22. The method as in claim 21 wherein said transfer means includes a support ring having a contour similar to the final desired contour for said overlaying glass sheets slightly inboard of the glass sheet perimeter.

23. The method as in claim 22 wherein said periphery of said overlaying glass sheets assumes the contour of said support ring to affect said shaping step.

* * * * *

UNITED STATES PATENT AND TRADEMARK OFFICE
CERTIFICATE OF CORRECTION

PATENT NO. : 4,661,139
DATED : April 28, 1987
INVENTOR(S) : Thomas J. Reese, John J. Ewing, Michael T. Fecik, Robert G. Frank and Terry A. Bennett It is certified that error appears in the above-identified patent and that said Letters Patent is hereby corrected as shown below:

Claim 14, line 1, delete "12" and insert --11--.

Claim 15, line 1, delete "15" and insert --14--.

Signed and Sealed this

Third Day of July, 1990

Attest:

HARRY F. MANBECK, JR.

*Attesting Officer*   *Commissioner of Patents and Trademarks*